Figure 1:
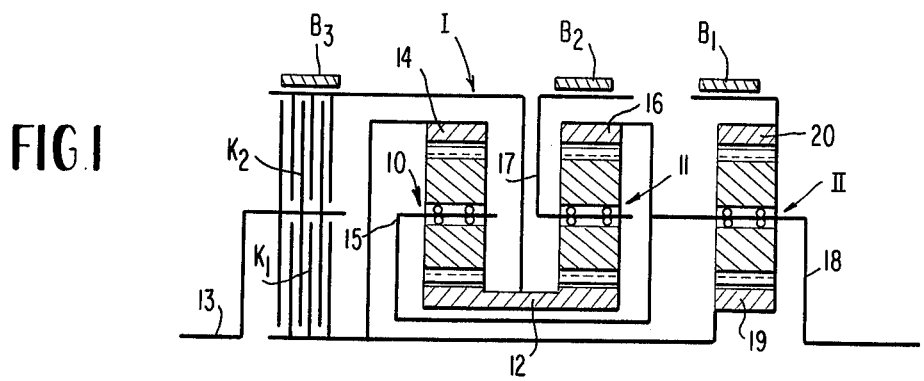

United States Patent [19]

Förster et al.

[11] 4,089,238
[45] May 16, 1978

[54] PLANETARY GEAR CHANGE-SPEED TRANSMISSION, ESPECIALLY FOR MOTOR VEHICLES

[75] Inventors: Hans-Joachim M. Förster, Stuttgart-Riedenberg; Wolfgang Zaiser, Althutte Kr. Welzheim; Werner Hensel, Berkheim, uber Esslingen, all of Germany

[73] Assignee: Daimler-Benz Aktiengesellschaft, Germany

[21] Appl. No.: 340,882

[22] Filed: Mar. 13, 1973

Related U.S. Application Data

[62] Division of Ser. No. 702,238, Feb. 1, 1968, abandoned.

[30] Foreign Application Priority Data

Feb. 3, 1967 Germany .............................. 1555205

[51] Int. Cl.² ............................................ F16H 57/10
[52] U.S. Cl. ...................................... 74/759; 74/761; 74/763; 74/765
[58] Field of Search ................. 74/759, 763, 758, 760, 74/761, 762, 764, 765

[56] References Cited

U.S. PATENT DOCUMENTS

| | | | |
|---|---|---|---|
| 2,176,138 | 10/1939 | Kelley | 74/763 |
| 2,748,622 | 6/1956 | Syrovy et al. | 74/763 |
| 3,300,001 | 1/1967 | Stockton | 74/763 |
| 3,730,022 | 5/1973 | O'Malley | 74/759 |

*Primary Examiner*—Samuel Scott
*Assistant Examiner*—Lance W. Chandler
*Attorney, Agent, or Firm*—Craig & Antonelli

[57] ABSTRACT

A planetary gear change-speed transmission, especially for motor vehicles in which a first group consisting of planetary gear sets provides three forward speeds and a reverse speed with one of the elements of the first group constituting a common input member for all forward speeds and another element forming the input member for the reverse speed, whereby both input members are adapted to be connected with the driving engine by way of a clutch, and in which a second group consisting of sun gear, ring gear and planet gear arranged on a carrier is operatively connected with the first group in such a manner that the output of the second group is rigidly connected with the output of the first group, the second element of the second group is adapted to be braked while a third element is adapted to be connected with a further member of the first group so as to produce four forward speeds and a reverse speed which can be engaged without group-change.

47 Claims, 14 Drawing Figures

PLANETARY GEAR CHANGE-SPEED TRANSMISSION, ESPECIALLY FOR MOTOR VEHICLES

BACKGROUND OF THE INVENTION

This application is a divisional application of co-pending application Ser. No. 702,238, filed on Feb. 1, 1968, now abandoned.

The present invention relates to a planetary gear change-speed transmission, especially for motor vehicles with a first group of planetary gear sets providing three forward speeds and a reverse speed which includes one driving or input member for all forward speeds and another driving or input member for the reverse speed whereby each driving member is adapted to be connected either selectively or both together with the driving engine by means of a clutch.

SUMMARY OF THE INVENTION

The aim underlying the present invention resides in enlarging the transmissions of the aforementioned type into a four-speed transmission. This further development and enlargement is thereby to take place in such a manner that all four speeds can be engaged without group changes and that additionally a reverse speed also results at the same time with a greater speed reduction. Furthermore, the enlargement is to take place as much as possible in such a manner that it can be realized in a simple manner from a constructive point of view and possibly enables the construction of a transmission series in the manner of a building block system.

The underlying problems are solved according to the present invention with the transmissions of the aforementioned type in that a second group consisting of sun gear, ring gear and at least one planet gear arranged on a carrier is coordinated whose driven or output member is rigidly connected with the driven or output members of the first group, whose second member is adapted to be braked and whose third member is connected with a further member of the first group. With a transmission of the construction in accordance with the present invention, only one actuating member, namely, a brake is coordinated to or associated with the second group. Consequently, the shifting operation can be continued to be realized without group change. Furthermore, a reverse speed with greater speed reduction results at the same time. Finally, it is possible to leave substantially unchanged the structural assembly of the first group for the additional connection of the second group.

The bearing support and the construction and manufacture of the parts is first of all simplified in this manner and both transmissions can be utilized adjacent one another in the manner of a building-block series.

With one construction according to the present invention, the planet gear carrier constitutes the driven or output member in the second group and the ring gear constitutes the brakable second member whereby the sun gear is operatively connected as third member with the driving or input member effective as driving or input member for the forward speeds of the first group. This type of construction is particularly advantageous as viewed from the point of view of a building-block system. For the first group can be taken over thereby practically without change.

With a second type of construction according to the present invention, the ring gear serves in the second group as driven or output member and the planet gear carrier as brakable second member whereby the sun gear as third member is in operative connection with the reaction member of the first group effective in the second speed. It should be mentioned in that connection for sake of clarity that the last-mentioned reaction member refers to the reaction member of the first speed in this group insofar as one considers the first group by itself.

A large number of variations and modifications exist within both of these types of constructions with the utilization of at least a partly known feature. Thus, it is possible, for example, in accordance with the present invention to form the first gear group from two planetary gear sets whereby the ring gear of the second set forms the output or driven member and a central gear of the first set the forward driving or input of this first group. For example, the so-called, known "Simpson" planetary gear set is suitable for this purpose. In this case, the two sun gears are then rigidly connected with each other in the first group and serve as reverse speed drive or input. The ring gear in the first planetary gear set serves as driving or input member of the first group and the planet gear carrier of the second planetary gear set serves as reaction member in the first speed, insofar as one considers the first group by itself.

Another possibility essentially consists in utilizing two separate planetary gear sets. The sun gear of the first planetary gear set thereby forms the forward-speed drive or input. The two planet gear carriers in both planetary gear sets are connected with each other and form the reaction member of the first speed, insofar as one considers again the first group by itself.

Another possibility for the realization of the inventive concept resides in that the first group consists of two planetary gear sets whereby at least one planet gear belongs to both sets and in that the ring gear of the second set forms the output while the sun gear of the second set forms the forward-speed input or drive of the first group. One can utilize for that purpose a so-called pure Ravigneaux set, in which thus at least two mutually meshing planet gears are arranged on a common planet gear carrier and whereby one of these two planet gears simultaneously cooperates also with the central gear of the other planetary gear set. If one constructs this last-mentioned common planet gear with two different diameters, then one obtains a combination of a compound planetary gear set and of a Ravigneaux set. In both cases, the common planet gear carrier serves as reaction member of the first speed, insofar as the first group is again considered by itself.

Finally, another construction is proposed in accordance with the present invention pursuant to which the first group consists of two planetary gear sets whereby at least one planet gear belongs to both sets and in that the carrier of this common planet gear forms the output while the ring gear of the second set forms the forward-speed input of the first group. Also in this case there exists again the combination of a Ravigneaux with a compound planetary gear set as well as the further possibility of a pure planetary gear set. A ring gear serves in the first-mentioned case as reaction member for the first speed—considering this group again by itself—whereas in the latter case a sun gear serves as reaction member for the first gear—again considering this group by itself.

In all of the modifications described so far, it was always contemplated to connect the second group in its operation to the rear of the first group and also to arrange the same spatially to the rear of the first group. The side facing the output is thereby always considered as being "to the rear." However, one is able to considerably simplify the construction of the transmission if, according to a further feature of the present invention, the second group is arranged spatially in front of the first group whereby two similar central gears of both groups are rigidly connected with each other or are formed by a common central gear. The advantage of this simplification resides in that —as will be explained more fully hereinafter by reference to the drawing—the number of the connecting parts radially arranged between the gear wheels can be significantly reduced. Particularly advantageous for this simplification is the construction with a pure Ravigneaux set. The ring gears of the first and second group are then constituted by a common gear. A similar picture results with the use of a pure compound planetary gear set as first group whereby the sun gears of the first and second group are then rigidly connected with each other.

Accordingly, it is an object of the present invention to provide a four-speed change-speed transmission which obviates the aforementioned shortcomings and drawbacks encountered with the prior art constructions.

Another object of the present invention resides in a change-speed transmission of the aforementioned type in which all four forward speeds can be shifted without group change and which, at the same time, produces a greater speed reduction in the reverse speed.

A further object of the present invention resides in a change-speed transmission of the type described above which is simple in construction, utilizes relatively few parts and makes possible the construction of a transmission series in the manner of a building-block system.

Still another object of the present invention resides in a change-speed transmission providing four forward speeds and a reverse speed in which only one actuation member needs to be coordinated to the second group.

A still further object of the present invention resides in a planetary gear change-speed transmission, especially for motor vehicles, consisting of two groups in which the constructive arrangement of the first group can be left almost unchanged when adding thereto the second group.

Another object of the present invention resides in a planetary gear change-speed transmission providing four forward speeds and a reverse speed which simplifies the bearing supports as well as the construction and manufacture of parts.

Figure 13:
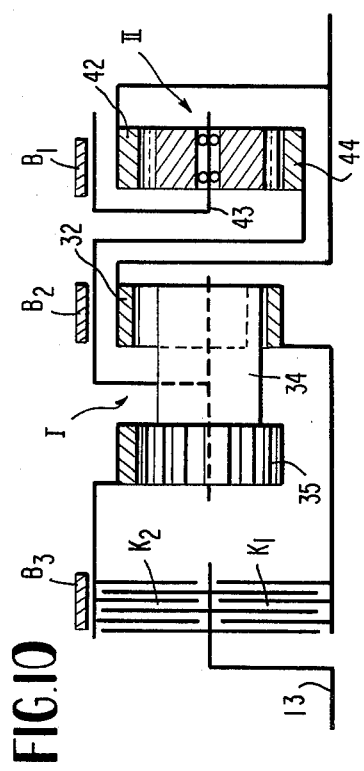
Figure 14:
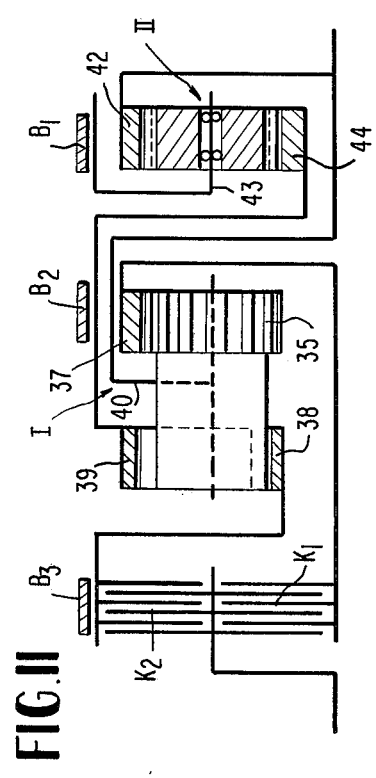
Figure 9:
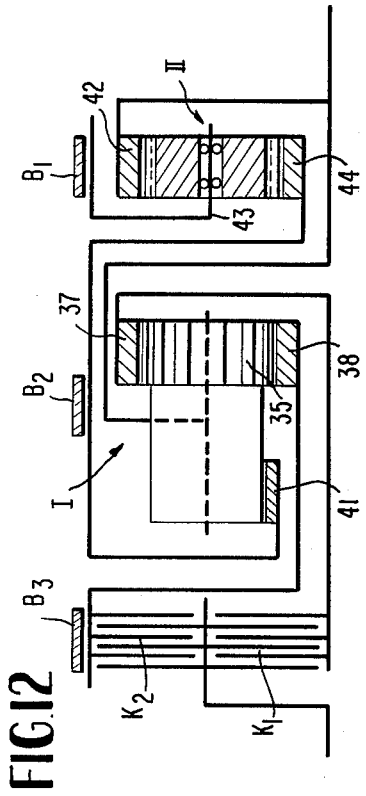
Figure 10:
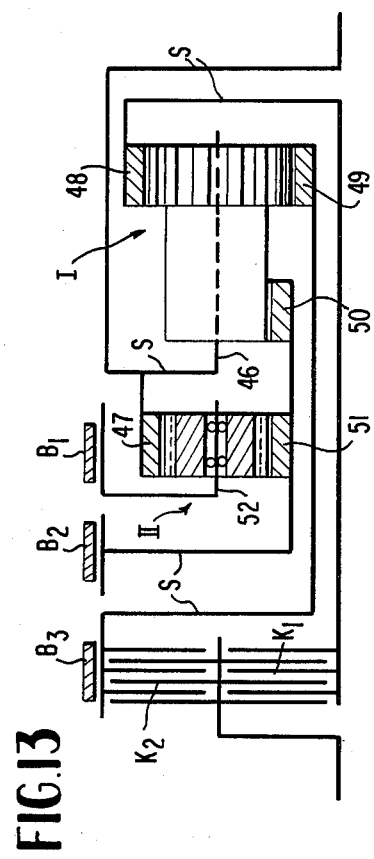
Figure 11:
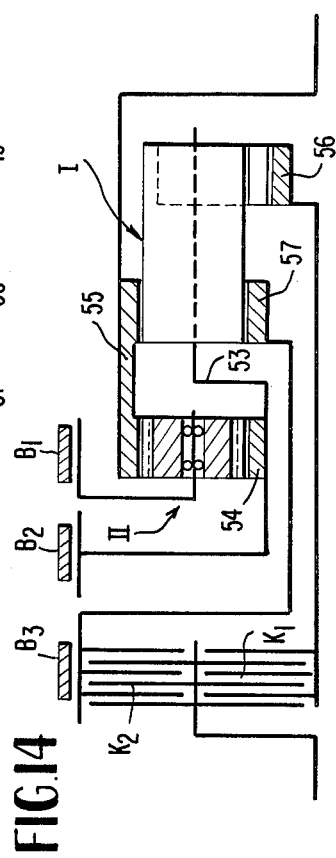

These and further objects, features and advantages of the present invention will become more obvious from the following description when taken in connection with the accompanying drawing which shows, for purposes of illustration only, several embodiments in accordance with the present invention, and wherein:

FIGS. 1 to 6 are schematic cross-sectional views through six different embodiments of planetary gear transmissions in accordance with the present invention in which the carrier of the second group serves as output;

FIGS. 7 to 12 are schematic cross-sectional views through six further modified embodiments of a planetary gear transmission in accordance with the present invention in which the ring gear of the second group serves as output; and FIGS. 13 and 14 are schematic cross-sectional views of two further modified embodiments of planetary gear transmissions in accordance with the present invention in which the second group is arranged in front of the first group.

Referring now to the drawing wherein like reference numerals are used throughout the various views to designate like parts and more particularly to FIG. 1, the planetary gear change-speed transmissions illustrated therein consist of a first group generally designated by reference numeral I and of a second group generally designated by reference numeral II. The first group I again consists, in its turn, of two planetary gear sets generally designated by reference numerals 10 and 11. These two planetary gear sets 10 and 11 have a common sun gear 12 which is adapted to be connected with the input or drive 13 by way of a clutch $K_2$. The ring gear 14 of the first planetary gear set 10 is adapted to be connected with the drive or input 13 by way of a clutch $K_1$. The carrier 15 of the first planetary gear set 10 is rigidly connected with the ring gear 16 of the second planetary gear set 11 whereas the carrier 17 of the second planetary gear 11 is adapted to be braked by means of a brake $B_2$.

The second group II consists of a planetary gear set connected to the rear or in the output of the first group I. The carrier 18 of the second planetary gear group II forms the output and is rigidly connected with the output of the first group I. This means the carrier 18 is rigidly connected with the drive connection between the carrier 15 and the ring gear 16. The sun gear 19 of the second group II is directly connected with the ring gear 14, i.e., is also operatively connected with the clutch $K_1$. The ring gear 20 of the second group II is adapted to be braked by means of a brake $B_1$.

OPERATION

The shifting operation of the transmission described above by reference to FIG. 1 is as follows:

In all forward speeds, the clutch $K_1$ is engaged. The first speed is obtained if, in addition to this clutch $K_1$, the brake $B_1$ is engaged. In second speed, the last-mentioned brake $B_1$ is again disengaged and in its place the brake $B_2$ is engaged. For the third speed, also the brake $B_2$ is again disengaged and a brake $B_3$ is engaged which is coordinated to the common sun gears 12. For the fourth speed, the brake $B_3$ is again disengaged—so that now no brakes remain engaged—and the clutch $K_2$ is engaged in addition to the clutch $K_1$. As a result thereof, the two groups I and II of the planetary gear change-speed transmission are locked in themselves and rotate as a unit. For the reverse speed, the clutch $K_2$ is now engaged in the place of the clutch $K_1$ and in addition thereto the brake $B_1$ is again engaged.

Figure 2:
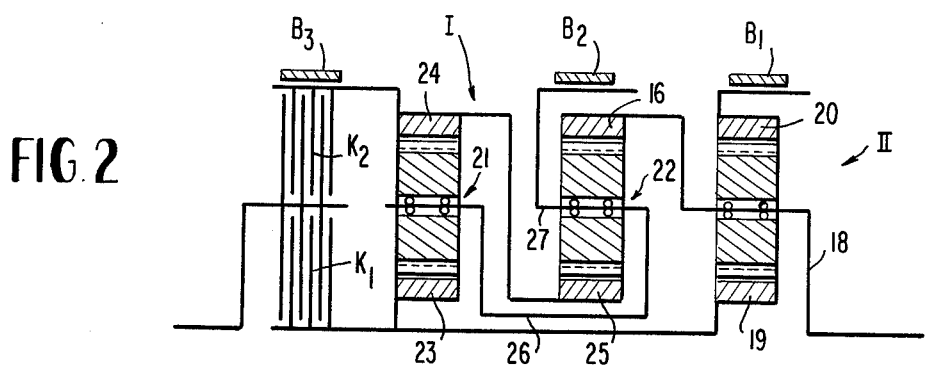

According to FIG. 2, the second group II is of the same type and constructed in the same manner. Its carrier 18 again forms the output and is again rigidly connected with the ring gear 16. Also, the sun gear 19 is connected with the clutch $K_1$, i.e., with the input for the forward speeds.

However, the first group I now consists of two separate planetary gear sets generally designated by reference numerals 21 and 22. The sun gear 23 of the planetary gear set 21 thereby serves as input or drive for the forward speeds and, accordingly, is operatively connected with the clutch $K_1$. The ring gear 24 of the planetary gear set 21 assumes the drive or input for the reverse speeds which is operatively connected with the clutch $K_2$ and additionally also with the sun gear 25 of the planetary gear set 22. The brake $B_3$ acts on this driving connection, i.e., in effect on the ring gear 24 and on the sun gear 25. The carriers 26 and 27 are rigidly connected with each other and are adapted to be braked by brake $B_2$.

The shifting operation of this transmission takes place in exactly the same manner as described hereinabove in connection with FIG. 1.

Figure 3:
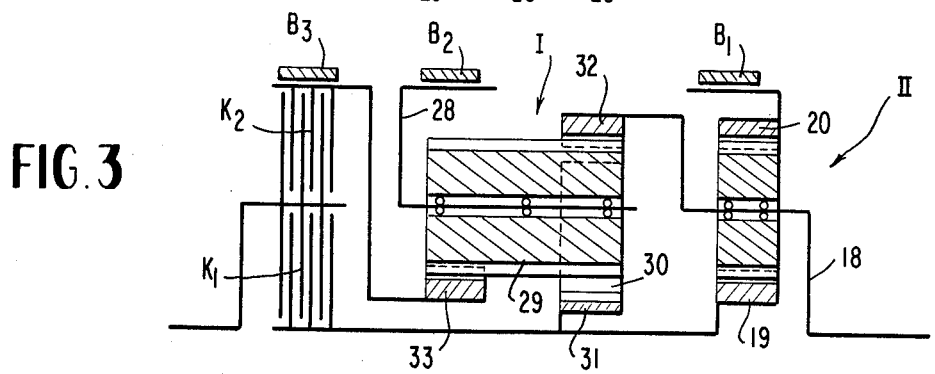

According to FIG. 3, the second group II is again of the same type and constructed in the same manner as before. Also, its connection with the first group I remains analogously the same.

The first group I is constructed in this embodiment as so-called pure Ravigneaux set. At least two planet gears 29 and 30 are arranged on a common carrier 28 which mesh or engage with one another. A sun gear 31 which engages with the planet gear 30 forms the input or drive for the forward speeds and therefore is operatively connected with the clutch $K_1$ and with the sun gear 19 of the second group II. A ring gear 32 which engages or meshes with the planet gear 29, forms the output of the first group I and consequently is operatively connected with the carrier 18 of the second group II. The planet gear 29 is correspondingly extended or enlarged and meshes with a sun gear 33 which forms the input or drive for the reverse speed and is also operatively connected with the clutch $K_2$. The brake $B_3$ acts additionally on the sun gear 33.

The shifting operation of this transmission takes place again in exactly the same manner as described hereinabove in connection with FIG. 1.

Figure 4:
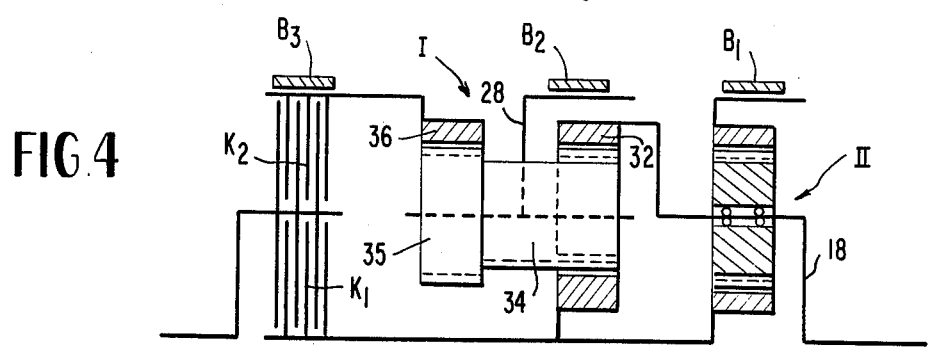

According to FIG. 4, the planetary gear change-speed transmission has basically the same construction as in FIG. 3. However, the common planet gear 34 in the first group I is now constructed with two different diameters. The ring gear 36 which engages with the section 35 of the planet gear 34 having the larger diameter, forms the input for the reverse speed and is operatively connected with the clutch $K_2$ and is also adapted to be braked by means of the brake $B_3$. The common carrier 28 is now extended outwardly between the ring gears 36 and 32 and is adapted to be braked by means of the brake $B_2$.

The shifting operation of this transmission also takes place in the same manner as described above.

Figure 5:
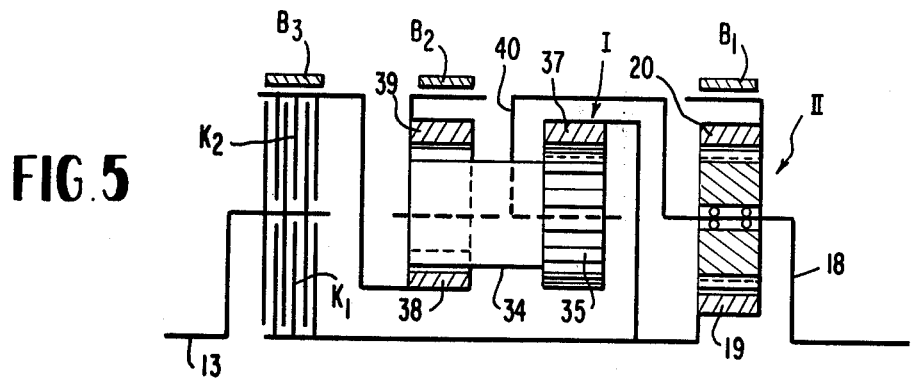

With the arrangement according to FIG. 5, the second group II is constructed in the manner already described in connection with FIGS. 1-4. In contradistinction thereto, the two planetary gear sets in the first group I are interchanged with one another as regards their position. The larger section 35 of the common planet gear 34 now is disposed to the rear, i.e., on the side facing the output. A ring gear 37, which now meshes with this larger section 35, forms the input or drive for the forward speeds and, therefore is rigidly connected with the clutch $K_1$ and with the sun gear 19 of the second group II. The drive in reverse speed takes place by way of a sun gear 38 which is operatively connected with the clutch $K_2$ and is adapted to be braked by the brake $B_3$. The second ring gear 39 is adapted to be braked by a brake $B_2$ whereas the common planet gear carrier 40 forms the output of the first group I and, therefore, is rigidly connected with the carrier 18 of the second group II.

The shifting operation of this transmission takes place in exactly the same manner as already described above.

Figure 6:
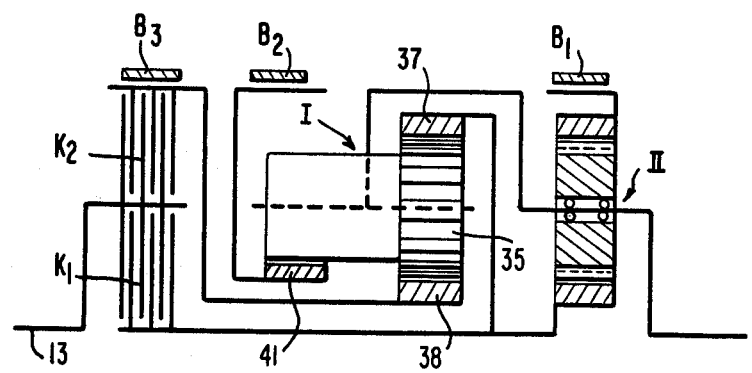

According to FIG. 6, only the sun gear 38 for the reverse speed input or drive is coordinated in the first group I to the larger section 35 of the common planet gear. A further sun gear 41 is now adapted to be braked by means of the brake $B_2$ whereas the ring gear 37 is again connected with the clutch $K_1$ for the forward speed input or drive.

Also, this transmission is shifted in the same manner as described above.

The transmissions of FIGS. 7 to 12 to be described hereinafter differ basically from the transmissions of FIGS. 1-6 described hereinabove with respect to the construction of the second group II. The construction of the first group I corresponds in FIGS. 7-12 to the arrangements and constructions according to FIGS. 1 to 6, respectively. The clutches and brakes are also constructed and arranged correspondingly. The shifting operations of all of these transmissions also take place again in the same manner. It should be noted also that the transmissions of FIGS. 7 to 12 inclusive produce a still lower ratio, i.e., a more indirect first speed. This may be advantageous in certain applications.

In the second group II the ring gear 42 now forms the output. Consequently, the ring gear 42 is rigidly connected with the output of the first group I. The carrier 43 of the second group II is adapted to be braked by the brake $B_1$. Consequently, it serves as reaction member. The sun gear 44 of the second group II is now no longer operatively connected with the input or drive of group I but is now operatively connected with the reaction member of the second speed or—if one considers the first group by itself—of the first speed, i.e., in case of FIG. 7 with the carrier 45 of the second planetary gear set in the first group I. The brake $B_2$ acts on this connection.

Figure 7:
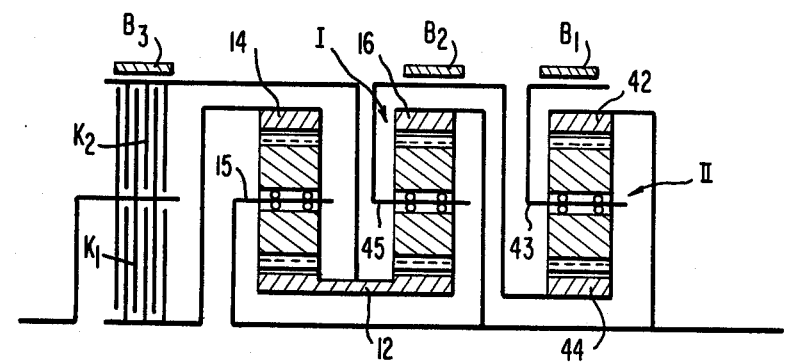
Figure 8:
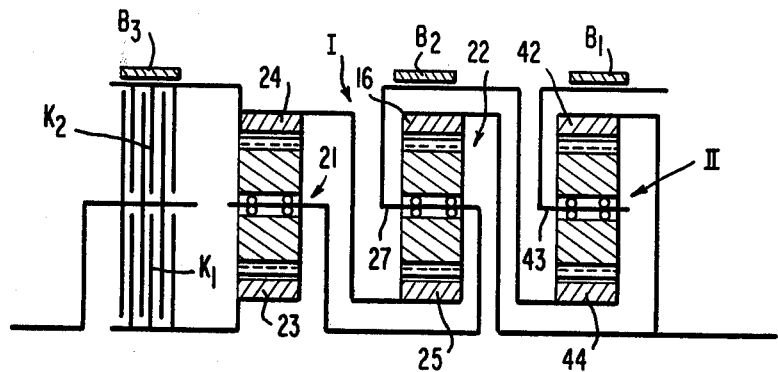
Figure 12:
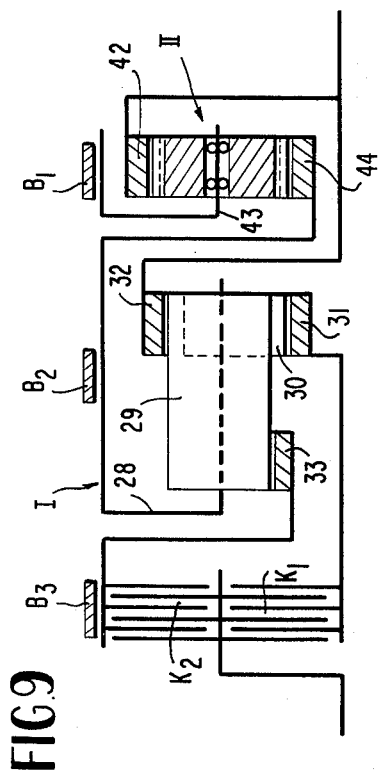

The transmissions according to FIGS. 8 to 12 illustrate the same construction in the second group II as according to FIG. 7 whereas they are identical in the construction of their first group I with the arrangements according to FIGS. 2 to 6, respectively. As already mentioned hereinabove, the shifting operations are identical with that described in connection with FIG. 1 in all of these transmissions.

With the transmissions according to FIG. 13, the second group II is arranged in front and the first group I to the rear. The latter is constructed as pure compound planetary gear set whose carrier 46 forms the output and is rigidly connected with the ring gear 47 of the second group II. The ring gear 48 serves as input or drive in all forward speeds, whereas the one sun gear 49 assumes the role of drive or input in the reverse speed. These two central gears 48 and 49 are connected in a manner already described hereinabove with the clutches $K_1$ and $K_2$. The second sun gear 50 of the first group I is rigidly connected with the sun gear 51 of the second group II or is formed by a unitary central gear. These two sun gears 50 and 51 are adapted to be braked by the brake $B_2$. The brake $B_1$ acts on the carrier 52 of the second group II. The advantage of this type of transmission construction results in that the radial webs S engaging between the gears can be reduced to a minimum. In the illustrated arrangement, for example, only six webs S are present.

The transmission arrangement according to FIG. 14 offers the same advantage. In this embodiment, the first group I is now constructed as pure Ravigneaux set.

The common carrier 53 is rigidly connected with the sun gear 54 of the second group II and is adapted to be braked by a brake $B_2$. Both groups I and II include a common ring gear 55 which forms the output. The two sun gears 56 and 57 form the output for the forward and reverse speeds, respectively, and accordingly are operatively connected with the clutches $K_1$ and $K_2$, respectively. The shifting operation of this transmission takes place in the same manner as described above.

Thus, in all embodiments, one clutch K is engaged in all four forward speeds, the other clutch $K_2$ is engaged in reverse speed and the same brake $B_1$ operable on the reaction member of the second planetary gear group II is engaged in first speed as well as in reverse speed so that the first speed in all embodiments is realized by the second planetary gear group II.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:

1. A four-speed planetary gear change-speed transmission, especially for motor vehicles, in which all four forward speeds can be engaged without group change, and which includes a first group of planetary gear set means having an output member, a plurality of rotating elements effectively providing three forward speeds and a reverse speed including sun, ring and planet gears as well as at least one planet carrier, one of said rotating elements forming an input member for all of said three forward speeds and another one of said rotating elements forming an input member for the reverse speed, each sun gear being rotatable independently of any other sun gear in the first group of planetary gear set means, and two clutch means enabling each input member to be connected either selectively or both together with the driving engine, wherein the improvement comprises a second group of planetary gear set means providing another forward speed forming the first speed of the transmission and consisting of a plurality of rotatable elements including a sun gear, a ring gear, and at least one planet gear arranged on a planet gear carrier, one of the rotatable elements of the second group forming an output member operatively connected for common rotation with the output member of the first group, a second rotatable element of the second group being adapted to be braked to obtain the first speed of the transmission with said first-mentioned input member connected with the driving engine by way of the first one of said clutch means, and a third rotatable element of the second group being operatively connected for positive rotation in unison with a rotatable element of the first group other than the output member and the another input member, the drive in all four forward speeds taking place by way of the engaged first clutch means connected with the first-mentioned input member of said first group and the second clutch means being engaged only in reverse speed.

2. A planetary gear change-speed transmission according to claim 1, further comprising engageable brake means operatively associated with the second rotatable element of the second group.

3. A planetary gear change-speed transmission according to claim 1, wherein the planet carrier forms the output member in the second group and the ring gear thereof forms the second element adapted to be braked whereas the sun gear thereof is operatively connected as third rotatable element with the input member of the first group effective for the forward speeds.

4. A planetary gear change-speed transmission according to claim 1, wherein one of the rotatable elements of the first planetary gear set means forms a reaction member effective in the second speed, and wherein the ring gear of the second group serves as output member and the planet gear carrier as second rotatable element adapted to be braked while the sun gear thereof is operatively connected as third element with the reaction member of the first group effective in the second speed.

5. A planetary gear change-speed transmission according to claim 3, wherein the first gear group consists of two planetary gear set means each having a plurality of rotatable elements including central gears, and wherein the ring gear of the second planetary gear set means of the first group forms the output member and a rotatable element of the first planetary gear set means of the first group forms the forward-speed input member of this first group.

6. A planetary gear change-speed transmission according to claim 5, wherein the rotatable element forming the forward speed input member of the first group is a central gear.

7. A planetary gear change-speed transmission according to claim 4, wherein the first gear group consists of two planetary gear set means each having a plurality of rotatable elements including central gears, and wherein the ring gear of the second planetary gear set means of the first group forms the output member and a rotatable element of the first planetary gear set means of the first group forms the forward-speed input member of this first group.

8. A planetary gear change-speed transmission according to claim 7, wherein the rotatable element forming the forward speed input member of the first group is a central gear.

9. A planetary gear change-speed transmission according to claim 1, wherein the first gear group consists of two planetary gear set means each having a plurality of rotatable elements including central gears, and wherein the ring gear of the second planetary gear set means of the first group forms the output member and a rotatable element of the first planetary gear set means of the first group forms the forward-speed input member of this first group.

10. A planetary gear change-speed transmission according to claim 9, wherein the rotatable element forming the forward speed input member of the first group is a central gear.

11. A planetary gear change-speed transmission according to claim 3, wherein the first group consists of two planetary gear set means each having a plurality of rotatable elements including a planet gear carried on a planet gear carrier and meshing with at least one central gear, at least one planet gear forming part of both planetary gear set means, and wherein a central gear of the second planetary gear set means forms the output member while a central gear of the second planetary gear set means forms the forward speed input member of the first group.

12. A planetary gear change-speed transmission according to claim 11, wherein a ring gear of the second planetary gear set means forms said output member while a sun gear of the second planetary gear set means forms said forward speed input member.

13. A planetary gear change-speed transmission according to claim 4, wherein the first group consists of two planetary gear set means each having a plurality of rotatable elements including a planet gear carried on a planet gear carrier and meshing with at least one central gear, at least one planet gear forming part of both planetary gear set means, and wherein a central gear of the second planetary gear set means forms the output member while a central gear of the second planetary gear set means forms the forward speed input member of the first group.

14. A planetary gear change-speed transmission according to claim 13, wherein a ring gear of the second planetary gear set means forms said output member while a sun gear of the second planetary gear set means forms said forward speed input member.

15. A planetary gear change-speed transmission according to claim 1, wherein the first group consists of two planetary gear set means each having a plurality of rotatable elements including a planet gear carried on a planet gear carrier and meshing with at least one central gear, at least one planet gear forming part of both planetary gear set means, and wherein a central gear of the second planetary gear set means forms the output member while a central gear of the second planetary gear set means forms the forward speed input member of the first group.

16. A planetary gear change-speed transmission according to claim 15, wherein a ring gear of the second planetary gear set means forms said output member while a sun gear of the second planetary gear set means forms said forward speed input member.

17. A planetary gear change-speed transmission according to claim 3, wherein the first group consists of two planetary gear set means each having a plurality of rotatable elements including a planet gear carried by a planet carrier and meshing with at least one central gear, at least one planet gear forming part of both sets, and the carrier of this common planet gear forming the output member while a central gear of the second planetary gear set means forms the forward speed input member of the first group.

18. A planetary gear change-speed transmission according to claim 17, wherein a ring gear of the second planetary gear set means forms said forward speed input member.

19. A planetary gear change-speed transmission according to claim 4, wherein the first group consists of two planetary gear set means each having a plurality of rotatable elements including a planet gear carried by a planet carrier and meshing with at least one central gear, at least one planet gear forming part of both sets, and the carrier of this common planet gear forming the output member while a central gear of the second planetary gear set means forms the forward speed input member of the first group.

20. A planetary gear change-speed transmission according to claim 19, wherein a ring gear of the second planetary gear set means forms said forward speed input member.

21. A planetary gear change-speed transmission according to claim 1, wherein the first group consists of two planetary gear set means each having a plurality of rotatable elements including a planet gear carried by a planet carrier and meshing with at least one central gear, at least one planet gear forming part of both sets, and the carrier of this common planet gear forming the output member while a central gear of the second planetary gear set means forms the forward speed input member of the first group.

22. A planetary gear change-speed transmission according to claim 21, wherein a ring gear of the second planetary gear set means forms said forward speed input member.

23. A planetary gear change-speed transmission according to claim 1, wherein the second group is arranged spatially in front of the first group and wherein two identical central gears of both groups are operatively connected with each other for common rotation.

24. A planetary gear change-speed transmission according to claim 23, wherein the two identical central gears of both groups are constituted by a common central gear.

25. A planetary gear change-speed transmission according to claim 13, wherein the second group is arranged spatially in front of the first group and wherein two identical central gears of both groups are operatively connected with each other for common rotation.

26. A planetary gear change-speed transmission according to claim 25, wherein the two identical central gears of both groups are constituted by a common central gear.

27. A planetary gear change-speed transmission according to claim 15, wherein the second group is arranged spatially in front of the first group and wherein two identical central gears of both groups are operatively connected with each other for common rotation.

28. A planetary gear change-speed transmission according to claim 27, wherein the two identical central gears of both groups are constituted by a common central gear.

29. A planetary gear change-speed transmission according to claim 9, wherein the second group is arranged spatially in front of the first group and wherein two identical central gears of both groups are operatively connected with each other for common rotation.

30. A planetary gear change-speed transmission, especially for motor vehicles, comprising a first group of planetary gear set means providing three consecutive forward speeds with finite transmission ratios and a reverse speed and having a plurality of rotatable elements including planet gear means carried on planet carrier means and meshing with sun and ring gear means, one of the rotatable elements of said first group forming an input member common to all of said three forward speeds and another rotatable element forming an input member for reverse speed while still another element of said first group forms an output member, and a second group of planetary gear set means consisting of a plurality of rotatable elements, further means including engageable means and connecting means operatively connecting said second group with said first group without change in said first group to provide four forward speeds with finite transmission ratios and a reverse speed, with the first forward speed being effectively provided by said second group, one of the rotatable elements of the second group forming an output member operatively connected with the output member of the first group, a second rotatable element of the second group forming a reaction member adapted to be braked and a third rotatable element of the second group being connected with a rotatable element of the first group other than the output member and the second-mentioned input member thereof, one of said engageable means forming a brake in both directions of rotation for the reaction member of said second group which is engaged in first as well as in reverse speed, and each sun gear means of said first group of planetary gear set means being devoid of a fixed connection with any other sun gear means thereof.

31. A planetary gear change-speed transmission according to claim 30, characterized in that the engageable means operable on some of said rotatable elements provide said four forward speeds and the reverse speed with engagement of consecutive forward speeds only requiring disengagement of one and engagement of another engageable means.

32. A planetary gear change-speed transmission according to claim 30, wherein only one engageable means is associated with said second group.

33. A four-speed planetary gear change-speed transmission, especially for motor vehicles in which all four speeds can be engaged without group change, comprising a first group of planetary gear set means providing three consecutive forward speeds and a reverse speed and having a plurality of rotatable elements incuding planet gear means carried on planet carrier means and meshing with sun and ring gear means, each sun gear means being rotatable independently of any other sun gear means in said first group of planetary gear set means, one of the sun and ring gear means of said first group forming an input member common to all of the three forward speeds and at least another rotatable element constituted by at least one of the sun and ring gear means of said first group other than two fixedly interconnected sun gear means forming an input member for reverse speed while still another element of said first group forms an output member, and a second group of planetary gear set means consisting of a plurality of rotatable elements including a sun gear, a ring gear, and at least one planet gear arranged on a carrier, further means including only five engageable means and connecting means operatively connecting said second group with said first group to provide four forward speeds and a reverse speed in such a manner that only one engageable means has to be disengaged and another engeagable means has to be engaged for shifting from one forward speed to another forward speed, with the first speed being effectively provided by the second group by way of said first-mentioned input member, one of the rotatable elements of the second group forming an output member operatively connected with the output member of the first group, a second rotatable element of the second group forming a reaction member and a third rotatable element of the second group being connected with a rotatable element of the first group other than the output member and the second-mentioned input member thereof, one of said engageable means, forming a brake for the reaction member of said second group which is engaged in first as well as in reverse speed, and two other engageable means forming clutches selectively connecting an input shaft with said two input members, respectively, one of said clutches being engaged in first speed and the other in reverse speed.

34. A planetary gear change-speed transmission according to claim 33, wherein the planet carrier in the second group forms the output member thereof and the ring gear the reaction member thereof adapted to be braked whereas the sun gear thereof is operatively connected with the input member of the first group effective for the forward speeds.

35. A planetary gear change-speed transmission according to claim 33, wherein the ring gear in the second group serves as the output member thereof and the planet gear carrier as reaction member adapted to be braked while the sun gear is operatively connected with the reaction member of the first group effective in the second speed.

36. A planetary gear change-speed transmission according to claim 33, wherein the first gear group consists of two planetary gear set means and wherein the ring gear of the second set forms the output member and a central gear of the first planetary gear set means the forward-speed input member of this first group.

37. A planetary gear change-speed transmission according to claim 33, wherein the first group consists of two planetary gear set means, at least one planet gear forming part of both planetary gear set means, and wherein the ring gear of the second planetary gear set means forms the output while a sun gear of the second planetary gear set means forms the forward-speed input member of the first group.

38. A plantary gear change-speed transmission according to claim 33, wherein the first group consists of two planetary gear set means, at least one planet gear forming part of both planetary gear set means, the carrier of this common planet gear forming the output member while the ring gear of the second planetary gear set means forms the forward speed input member of the first group.

39. A planetary gear change-speed transmission according to claim 33, wherein the second group is arranged spatially in front of the first group and wherein two central gears of both groups are operatively connected with each other for common rotation.

40. A planetary gear change-speed transmission according to claim 39, wherein said two central gears of both groups are identical and are constituted by a common central gear.

41. A planetary gear change-speed transmission according to claim 33, wherein the second group is arranged spatially in front of the first group.

42. A planetary gear change-speed transmission according to claim 41, wherein the first group consists of two planetary gear set means, at least one planet gear forming part of both planetary gear set means.

43. A planetary gear change-speed transmission according to claim 42, wherein the ring gear of the second group forms the output member and is operatively connected with the planet carrier for the planet gear forming part of both planetary gear set means.

44. A planetary gear change-speed transmission according to claim 43, wherein the ring gear of the second planetary gear set means forms the forward speed input member of the first group.

45. A planetary gear change-speed transmission according to claim 1, characterized by means for realizing the four forward speeds and the reverse speed by the use of only five engageable means including the two clutch means which are so coordinated to certain of said rotatable elements that two of the engageable means are engaged for each of the forward speeds and for the reverse speed and that only one of the engageable means has to be disengaged and another one engaged when shifting from a forward speed to the next higher or lower speed, and that only one engageable means has to be disengaged and another engageable means engaged when shifting from first forward speed to reverse speed.

46. In a power transmission, the combination of a drive shaft, a first planetary gear group having plural input members, plural output members and plural reaction members, a second planetary gear group having an input member, an output member and another member, a driven shaft, drive connected to said output member of said second planetary gear group, a first means for interconnecting one input member of said first planetary gear group and the input member of the second planetary gear group, a second means for connecting only one output member of said first planetary gear group with said output member of said second planetary gear group, a first driving means for selectively connecting said drive shaft to said first means, a second driving means for selectively operably connecting said drive shaft to at least one input member of said first planetary gear group, a first holding means for selectively holding one reaction member of said first planetary gear group from rotation, a second holding means for selectively holding said another member of said second planetary gear group from rotation, a third holding means for selectively holding another reaction member of said first planetary gear group from rotation, said first driving means and said second holding means being selectively operable to establish a forward drive ratio, and said second driving means and said second holding means being selectively operable to establish a reverse drive ratio.

47. In a power transmission the combination of a drive shaft, a first planetary gear group having plural input members, plural output members and plural reaction members, a second planetary gear group having an input member, an output member and another member, a driven shaft drive connected to said output member of said second planetary gear group, a first means for interconnecting one input member of said first planetary gear group and the input member of the second planetary gear group, a second means for connecting one output member of said first planetary gear group with said output member of said second planetary gear group, a first driving means for selectively operably connecting said drive shaft to said first means, a second driving means for selectively operatively connecting said drive shaft to the other input member of said first planetary gear group, a first holding means for selectively holding one reaction member of said first planetary gear group from rotation, a second holding means for selectively holding said another member of said second planetary gear group from rotation and a third holding means for selectively holding another reaction member of said first planetary gear group from rotation.

* * * * *